United States Patent [19]

Polye

[11] 3,715,638
[45] Feb. 6, 1973

[54] TEMPERATURE COMPENSATOR FOR CAPACITIVE PRESSURE TRANSDUCERS

[75] Inventor: William Ronald Polye, River Edge, N.J.

[73] Assignee: The Bendix Corporation

[22] Filed: May 10, 1971

[21] Appl. No.: 112,359

[52] U.S. Cl. ............. 317/247, 317/246, 317/256, 338/25, 338/334
[51] Int. Cl. .............................................. H01y 3/24
[58] Field of Search.............. 317/246, 247, 253, 256; 73/398 C; 338/25, 334

[56] References Cited

UNITED STATES PATENTS

| | | | |
|---|---|---|---|
| 2,725,548 | 11/1955 | Harris | 73/398 C |
| 2,940,035 | 6/1960 | Lefkowitz | 317/256 X |
| 3,253,207 | 5/1966 | Fauch | 317/253 |
| 3,405,559 | 10/1968 | Moffatt | 317/240 |

OTHER PUBLICATIONS

Dummor Fixed Resistors, Pitman & Sons, London 1967, pp. 41, 56 & 57.

*Primary Examiner*—E. A. Goldberg
*Attorney*—S. H. Hartz and Plante, Hartz, Smith and Thompson

[57] ABSTRACT

A pressure transducer of the capacitor type having a body of dielectric material has a thin film resistor deposited on the body for sensing the temperature of the body. The resistor is of a material having a suitable temperature coefficient of resistivity to provide a signal corresponding to the temperature of the body for temperature correction.

8 Claims, 4 Drawing Figures

PATENTED FEB 6 1973

3,715,638

INVENTOR.
William Ronald Polye
BY
ATTORNEY

TEMPERATURE COMPENSATOR FOR CAPACITIVE PRESSURE TRANSDUCERS

The invention relates to temperature compensation and more particularly to temperature compensation for capacitive type pressure transducers.

The magnitude of error caused by temperature changes of such transducers mainly depends upon the materials of construction, the design details and the operating temperature range. In most cases when high accuracy is required over large temperature excursions, the variation in elastic constant (Young's Modulus) of the transducer material is the most significant factor contributing to error. A direct approach for correcting this error is to measure the temperature of the transducer by electrical means and apply a correction voltage to the capacitor output. The main difficulty heretofore in sensing the transducer temperature is that unwanted stresses are created on the sensitive deflecting members of the transducer.

One object of the present invention is to sense the temperature of a pressure transducer without creating unwanted stresses on the sensitive deflecting members of the transducer.

Another object of the invention is to provide a thin film resistor on the sensitive deflecting members of the transducer.

Another object is to deposit the film resistor on the transducer during one of the regular steps in fabricating the transducer.

Another object is to deposit the thin film resistor by vacuum evaporation or sputtering.

The invention contemplates a pressure transducer of the capacitor type having a body of dielectric material such as quartz with a thin film resistor deposited on the body by vacuum evaporation or sputtering for sensing the temperature of the body. The resistor is of a material such as nickel or platinum having a relatively high temperature coefficient of resistivity for providing a signal corresponding to the temperature of the body. The thin film resistor preferably is deposited on the body simultaneously with a thin film electrostatic shield of the same material as the thin film resistor.

These and other objects and advantages of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

Figure 1:
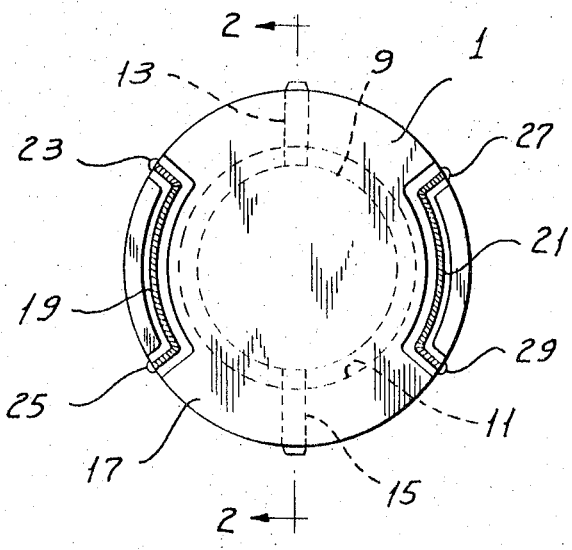
FIG. 1 is a top view of a capacitive type pressure transducer having a thin film resistor deposited thereon in accordance with the invention.
Figure 2:
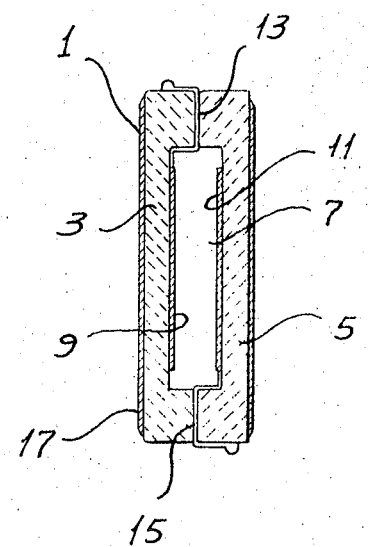
FIG. 2 is a transverse vertical section taken on the line 2—2 of FIG. 1.

Referring to the drawing which shows a pressure transducer having novel thin film resistors constructed according to the invention, the pressure transducer has a body 1 of dielectric material such as glass or quartz. The body is formed of a pair of shallow cup-like members 3, 5 sealed together to provide a chamber 7 therein which may be evacuated in a well known manner. Capacitor plates 9, 11 are deposited on the opposing inner faces of members 3, 5 and form a capacitor which provides a signal corresponding to the sensed pressure applied exteriorly of body 1. Suitable connectors 13, 15 may be provided on capacitor plates 9, 11 for connection in an electrical circuit. To avoid the introduction of active capacitance in the electrical measurements a thin film metallic coating 17 is provided on the external surfaces of body 1 to provide an electrostatic shield.

The temperature sensors in the present invention are thin film resistors 19, 21 of the order of a few hundred Angstroms in thickness which are deposited on the pressure sensitive deflecting members of body 1, preferably simultaneously with the electrostatic shield by vacuum evaporation or sputtering. The resistors are insulated electrically from the electrostatic shield by using stencil marks or by etching after deposition. The resistors preferably are of a material, such as nickel or platinum, which has a relatively high temperature coefficient of resistivity for providing a signal corresponding to the temperature of body 1. For convenience, the thin film metallic coating 17 may also be of the same material so that the thin film resistors 19, 21 and thin film metallic coating 17 can be deposited simultaneously. Resistors 19, 21 have suitable terminals 23, 25, 27, 29 at their ends for connection in a circuit as described hereinafter.

Figure 3:
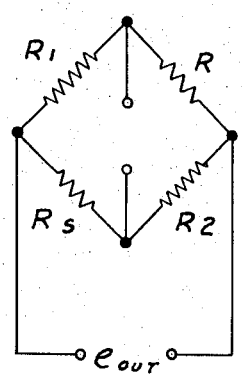
FIG. 3 is a schematic diagram of a bridge circuit including thin film resistors for providing temperature compensating signals.

Resistors 19 and 21 may be connected in opposite legs of a bridge circuit as shown in FIG. 3 at $R_1$, $R_2$ and their resistances are compared with the resistances of reference resistors $R_s$ connected in the other opposite legs of the bridge circuit. A suitable voltage supply is connected across opposing terminals of the bridge circuit and a signal corresponding to the resistance of resistors $R_1$ and $R_2$ is provided on the other two opposing terminals of the bridge circuit in the usual manner. The temperature compensating signal may be used in any well known manner for temperature correcting the capacitor signal corresponding to pressure.

Figure 4:
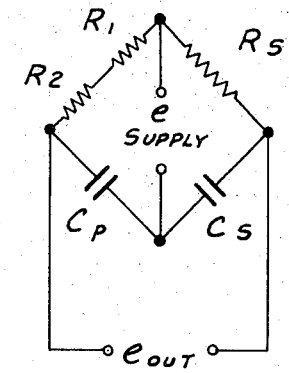
FIG. 4 is a schematic diagram of a bridge circuit including the pressure transducer capacitors and thin film resistors for providing a temperature compensated pressure signal.

One suitable arrangement for correcting the capacitor signal for temperature variations is shown in FIG. 4 wherein resistors $R_1$ and $R_2$ are connected in one leg of a bridge circuit and a reference resistor $R_s$ is connected in a second leg of the bridge circuit. The pressure sensing capacitor $C_p$ is connected in a third leg of the bridge and a reference capacitor $C_s$ is connected in a fourth leg of the bridge. A suitable voltage supply is connected across the bridge to opposing terminals between the legs with the resistors and between the legs with the capacitors and a temperature compensated pressure signal is provided across the other two opposing terminals of the bridge.

A pressure transducer having thin film resistors deposited on the sensitive deflecting members in accordance with the invention provides a temperature compensated pressure signal without creating unwanted stresses on the sensitive deflecting members and the pressure signal is accurately compensated for variations in temperature. The thin film resistors can be deposited on the transducer during one of the regular steps in fabricating the transducer by vacuum evaporation or sputtering.

What is claimed is:

1. A pressure responsive capacitor comprising pressure deflectable supporting means with electrical conducting means on said supporting means, the conducting means having non-solid means therebetween forming the dielectric of the capacitor, a thin film resistor deposited on said supporting means for sensing the temperature of the supporting means, the resistor being of a material having a relatively high temperature coefficient of resistivity for providing a signal corresponding to the the temperature of the supporting means.

2. A pressure transducer of the kind described in claim 1 in which the thin film resistor is deposited on the body by vacuum evaporation.

3. A pressure transducer of the kind described in claim 1 in which the thin film resistor is deposited on the body by sputtering.

4. A pressure transducer of the kind described in claim 1 having means for connecting the resistor in an electrical circuit.

5. A pressure transducer of the kind described in claim 1 in which the dielectric material is quartz.

6. A pressure transducer of the kind described in claim 1 in which the material of the resistor is nickel.

7. A pressure transducer of the kind described in claim 1 in which the material of the resistor is platinum.

8. A pressure transducer of the kind described in claim 1 in which a thin film electrostatic shield of the same material as the thin film resistor is deposited on the body simultaneously with the thin film resistor and is electrically insulated therefrom.

* * * * *